United States Patent
Barnum et al.

(10) Patent No.: US 10,210,368 B2
(45) Date of Patent: Feb. 19, 2019

(54) SMART DRIVER

(71) Applicant: Kinestral Technologies, Inc., South San Francisco, CA (US)

(72) Inventors: Wally Barnum, South San Francisco, CA (US); Doug Brainard, South San Francisco, CA (US); Steve Coffin, South San Francisco, CA (US); Paul Nagel, South San Francisco, CA (US)

(73) Assignee: Kinestral Technologies, Inc., Hayward, CA (US)

( * ) Notice: Subject to any disclaimer, the term of this patent is extended or adjusted under 35 U.S.C. 154(b) by 0 days.

(21) Appl. No.: 15/820,881

(22) Filed: Nov. 22, 2017

(65) Prior Publication Data
US 2018/0144162 A1  May 24, 2018

Related U.S. Application Data

(60) Provisional application No. 62/511,268, filed on May 25, 2017, provisional application No. 62/426,128, filed on Nov. 23, 2016.

(51) Int. Cl.
| | |
|---|---|
| *G02F 1/163* | (2006.01) |
| *G06K 7/10* | (2006.01) |
| *G08C 17/02* | (2006.01) |
| *H04Q 9/00* | (2006.01) |
| *E06B 9/24* | (2006.01) |
| *G06F 3/0484* | (2013.01) |

(52) U.S. Cl.
CPC .......... *G06K 7/1095* (2013.01); *G02F 1/163* (2013.01); *G06K 7/10861* (2013.01); *G06K 7/10881* (2013.01); *G08C 17/02* (2013.01); *H04Q 9/00* (2013.01); *E06B 9/24* (2013.01); *E06B 2009/2464* (2013.01); *G06F 3/04842* (2013.01); *G08C 2201/42* (2013.01); *G08C 2201/93* (2013.01); *H04Q 2209/10* (2013.01)

(58) Field of Classification Search
CPC .................................. G06F 3/02; G06F 3/0238
See application file for complete search history.

(56) References Cited

U.S. PATENT DOCUMENTS

| | | | | |
|---|---|---|---|---|
| 2014/0160550 A1* | 6/2014 | Brown | ................ | H04L 12/2803 359/275 |
| 2015/0286941 A1* | 10/2015 | Blair | ........................ | E06B 9/68 706/11 |
| 2017/0279876 A1* | 9/2017 | Prasad | ................ | H04L 67/1002 |
| 2017/0325308 A1* | 11/2017 | Steiner | ............... | H05B 33/0854 |
| 2018/0010817 A1* | 1/2018 | Magcale | .................... | G06F 1/20 |

\* cited by examiner

*Primary Examiner* — Carlos Garcia
(74) *Attorney, Agent, or Firm* — Womble Bond Dickinson (US) LLP

(57) ABSTRACT

A smart driver system for electrochromic devices is provided. The system includes at least one smart driver having one or more processors, memory and a communication module. The at least one smart driver is configurable to couple to or integrate with one or more smart windows having electrochromic devices. The at least one smart driver is configurable to input identification information from a plurality of self-identifying components of a smart window system, including the one or more smart windows, and to self-initialize or self-adjust a plurality of operating parameters for operation of the self-identifying components in accordance with the identification information.

17 Claims, 9 Drawing Sheets

SMART DRIVER

BACKGROUND

Control of a single electrochromic window in isolation is relatively much simpler than control of electrochromic windows for a large installation such as an entire building. Also, repair or replacement of a single electrochromic window in isolation is simpler and less expensive than replacement or repair of an electrochromic window that has been installed in a building, especially a large commercial building in an urban area, where rental of a crane and street closure could be required for removal of the window. Regardless of location, it is undesirable to have an electrochromic window fail. In addition, features leading to user satisfaction may be unavailable in a simpler controller for electrochromic windows. It is within this context that the embodiments arise.

SUMMARY

In some embodiments, a smart driver system for electrochromic devices is provided. The system includes at least one smart driver having one or more processors, memory and a communication module. The at least one smart driver is configurable to couple to or integrate with one or more smart windows having electrochromic devices. The at least one smart driver is configurable to input identification information from a plurality of self-identifying components of a smart window system, including the one or more smart windows, and to self-initialize or self-adjust a plurality of operating parameters for operation of the self-identifying components in accordance with the identification information.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1A:
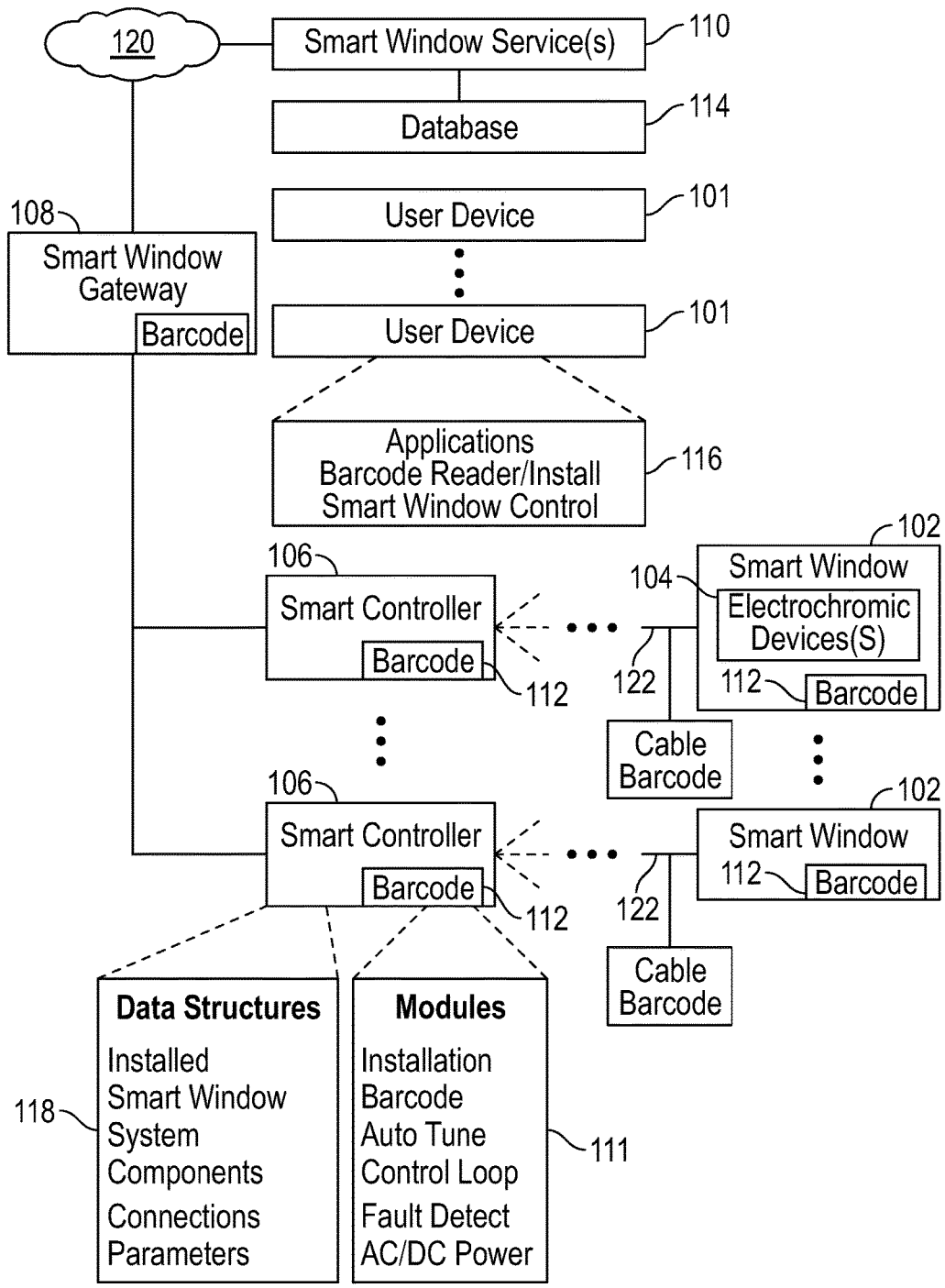
FIG. 1A is a system diagram for a smart window system with control in a distributed device network and features for installation, barcode reading, autotune, fault detection, and AC/DC power management.

FIG. 1A is a system diagram for a smart window system with control in a distributed device network and features for installation, barcode reading, autotune, fault detection, and AC/DC power management. Control of the smart windows 102 with the electrochromic devices 104 is distributed throughout the distributed device network, among user devices 101 with applications 116, the smart windows 102 themselves, smart controllers 106 (e.g. wall controllers or other controllers installed along with the smart windows 102), a smart window gateway 108, and smart window service(s) 110 available on a network 120 such as through cloud services on the Internet. Many types of user devices 101 could be used, such as smart phones, personal digital assistants (PDA), personal computers, laptop computers, touchscreen computers, etc. In some embodiments, each component, such as the smart window 102, the smart controller 106, the smart window gateway 108, and cables 122 or other physical interconnect, has a barcode 112 which can be read into the system during installation and also, later, during user operation and/or servicing. In some embodiments, each smart controller 106 has various data structures 118, including, for the installed smart window system, data regarding components, connections and parameters, and various modules 111, including an installation module, barcode module, an autotune module, a control loop, a fault detection module, and an AC/DC power management module.

During installation, each component, including the cables 122, is scanned to read the barcode 112 into the system. For example, a user device 101 such as a smart phone with a barcode reader application and/or an install application (e.g., applications 116), could be used by a user or technician to scan barcodes 112 on the components as they are installed. Other self-identifying mechanisms for receiving identification information from components during installation or operation, such as by scanning RFID (radio frequency identifier) tags attached to components, or OCR (optical character recognition) scanning of tags attached to components, etc., could be used in further embodiments in place of or augmenting the barcode scanning. This information is relayed (e.g., wirelessly and/or through a network) to a smart controller 106, the smart window gateway 108 and/or a smart window service 110 for recording in one or more databases 114. The application could prompt the user for the next component and for connections, both guiding installation and recording scanned barcodes 112 for components during installation, and the system could download relevant parameters from the smart window service 110. These parameters could include, for example voltage and current normal or expected values, minimums, maximums and thresholds of the electrochromic devices 104 according to specific model numbers, sizes, electrochromic chemistry, firmware revision numbers, etc., as deduced in accordance with the scanned barcode 112.

After installation, the system could perform an autotune, detecting and verifying resistances of cables 122, and verifying operation according to the various parameters, including downloaded parameters, making adjustments to parameters both in response to detection of operation and in response to user input (e.g., for rate of change of tinting of the windows, or minimum or maximum level of tint). If a user wants to select a specific window to operate, this could be done by again scanning a barcode 112 of that smart window 102, or by selecting from a graphical user interface on a user device 101 in coordination with the distributed device network and one of the data structures 118.

The system operates a control loop, and outside of the control loop a fault detection module or loop monitors the operation of the system. Upon detecting a fault, the system could send a message or have a visual indicator, e.g., on a display screen or touchscreen on the smart window gateway 108, a smart controller 106, or a user device 101, and could make appropriate adjustments to control, or disconnect a faulty smart window 102 or shut down the system.

Figure 1B:
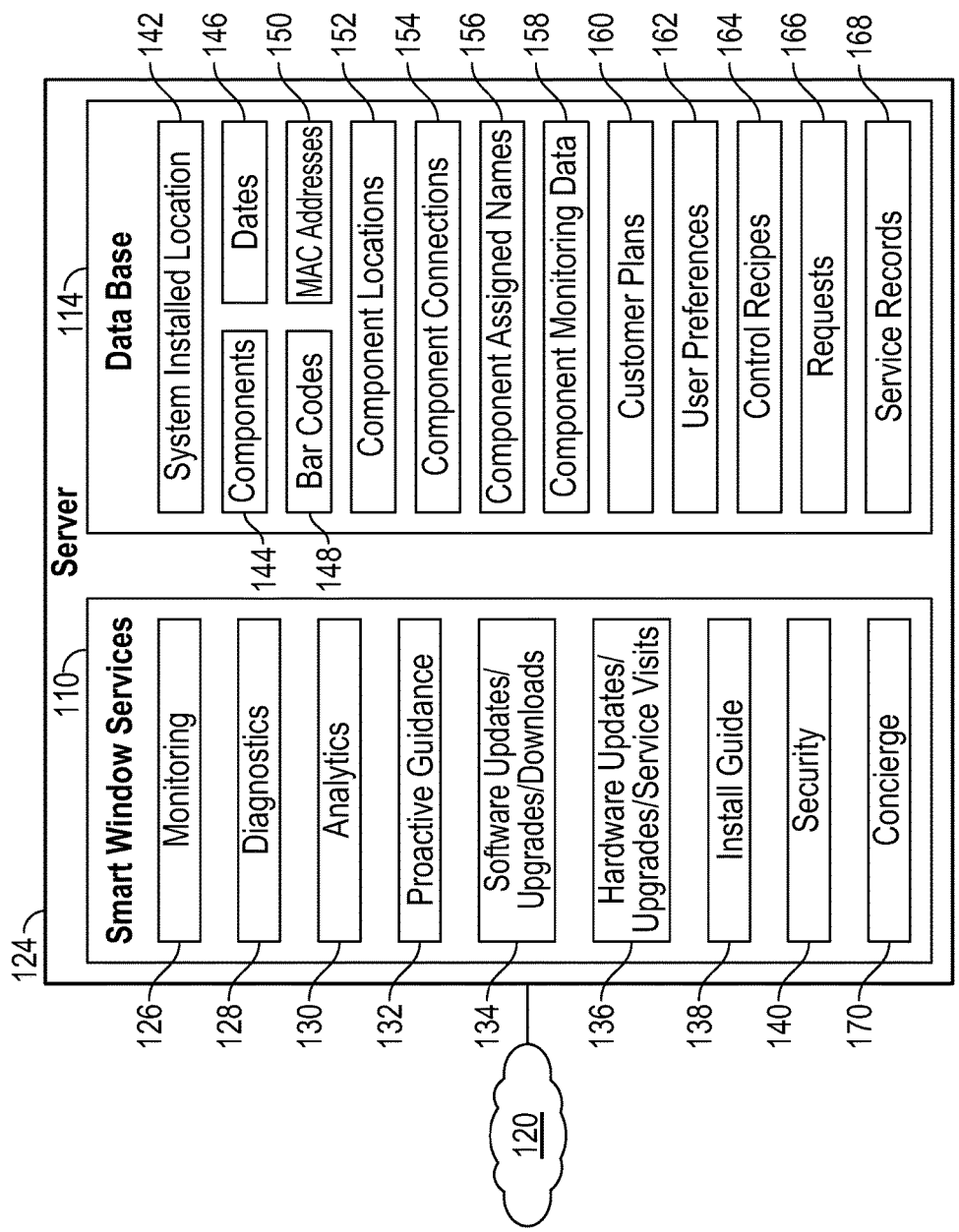
FIG. 1B depicts a server hosting the smart window services and database of FIG. 1A as a cloud service for the smart window system.

FIG. 1B depicts a server 124 hosting the smart window services 110 and database 114 of FIG. 1A as a cloud service for the smart window system. Smart window services 110 play a vital role in the distributed device network, in various embodiments of the smart window system, and allow a service provider to aggregate data from installed smart window systems for improved statistical analysis of a large installed base, customer service, and control and knowledge sharing. Also, centralizing the gathering and storage of device data relieves installed smart window systems from the burden of data storage, data transfer during upgrades, data recovery on failure, data security, and other problems arising from individual system management of data. In various embodiments, the server 124 could be a single server, multiple servers, a distributed server, a virtual server, etc., coupled to the network 120, e.g., the Internet. Various smart window services 110 can be implemented in various combinations and with various features in embodiments of the server 124 as software modules, coupled to the database 114, which could be local to the server 124 or remote or distributed, e.g., as cloud storage.

An install guide 138 of FIG. 1B coordinates with the user device 101 application 116 barcode reader application and install application, through the connection through the network 120, uploading scanned barcodes of components, MAC (media access control) addresses and/or IP addresses (e.g. from the components themselves through the smart window gateway 108), names of components, locations, and other information for the database 114 as entered through the user device 101 (e.g, through photographs of barcodes and equipment, and manual entry of names or selections and confirmations of install steps). The monitoring service 126 coordinates, through the network 120 connection, with the smart window gateway 108, smart controller(s) 106 and smart windows 102, uploading monitoring information from the various components for the database 114, as sent by the components of the smart window system.

Diagnostics 128 and analytics 130 modules of FIG. 1B cooperate with the monitoring service 126 and database 114 to look at various aspects of smart window system operation and system components. Among other services, the diagnostics 128 performs failure analysis. The diagnostics 128 and or analytics 130 look for anomalies in static or dynamic system behavior and operating parameters. A proactive guidance 132 cooperates with the diagnostics 128 and analytics 130, to predict device failure in advance, for example based on anomalous behavior, and make recommendations for further actions, for example software or hardware service. A software maintenance module 134 tracks and performs updates, upgrades and downloads of software for the smart window gateway 108, smart controller 106 and smart window 102 in various installations. Depending on circumstances and user agreements, software changes could be performed automatically, or with user request and/or or user verification. A hardware maintenance module 136 forms recommendations for updates, upgrades and service visits.

The security module 140 of FIG. 1B provides and enforces security for the database 114 and the server 124 itself. Also, the security module 140 coordinates installation of new or replacement components in smart windows installations, through cooperation with the smart window gateway 108, smart controllers 106 and smart windows 102. In some embodiments, security local to the installed smart window system is handled by the smart window gateway 108, and the security module 140 keeps the software for security up to date in the gateway 108 through the software maintenance module 134. The hardware maintenance module 136 could recommend when to replace the gateway 108, for example when hardware needs for security render the gateway 108 obsolete.

Concierge service 170 of FIG. 1B is supported in the server 124. Many users prefer not to have to train local personnel to learn complex user interfaces and to diagnose and service a complex system, and concierge service 170 is available to see to various user needs. A combination of automated services and staffed services, through the server 124, could be made available for various levels of user and system support, from warranty and upgrade services through fully hosted solutions. Remote monitoring, alerting, error reporting, and pushing of software upgrades could be part of concierge service 170, as could having a support team to answer phone calls and advise how to use the system and how to make changes.

Various embodiments of the database 114 of FIG. 1B coupled to the smart window services 110 have various combinations of the following data fields. Various data structures could be used in implementing the database 114, as readily devised, with various forms of links, associations, search capabilities, etc. Information could be organized on a per user or per installed system basis, and include system installed location 142, smart window components 144, various dates 146 such as install, service, inquiry, etc., barcodes 148, MAC addresses 150, component locations 152, component connections 154, component assigned names 156, and component monitoring data 158. For users, the database 114 could store customer plans 160, user preferences 162, requests 166, e.g. for specific equipment, technical issues, new features or general inquiries, etc., and service records 168.

Figure 2:
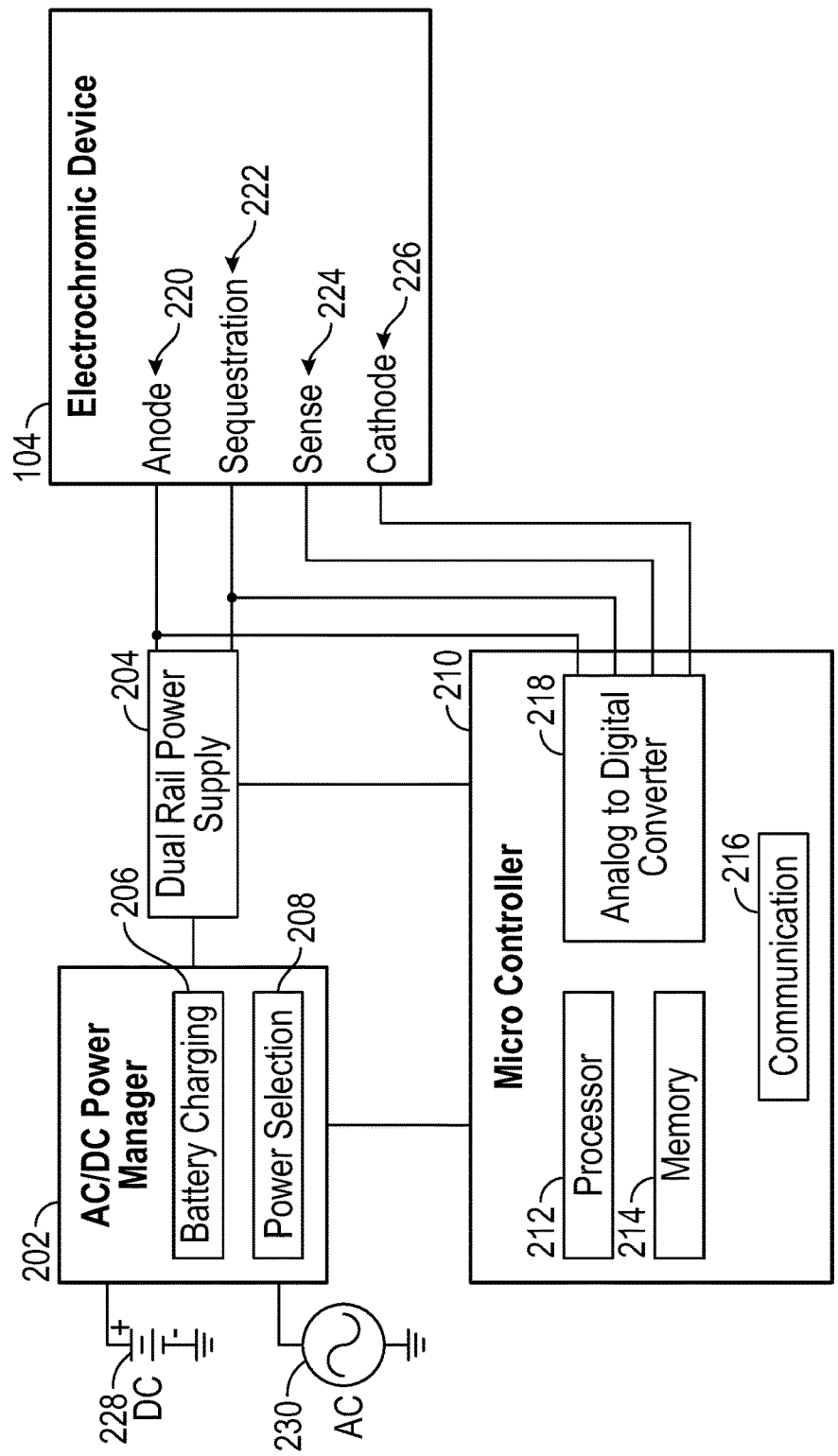
FIG. 2 is a block diagram showing a microcontroller, an AC/DC power manager and an embodiment of an electrochromic device with an anode, a cathode, a sequestration terminal and a sense voltage terminal, suitable for embodiments of the smart window system of FIG. 1A.

FIG. 2 is a block diagram showing a microcontroller 210, an AC/DC power manager 202 and an embodiment of an electrochromic device 104 with an anode 220, a cathode 226, a sequestration terminal 222 and a sense voltage terminal 224, suitable for embodiments of the smart window system of FIG. 1A. These components could be embodied in the smart controller 106 of FIG. 1A, the smart window 102, the smart window gateway 108, or be distributed in two or more of these, in various combinations. A microcontroller 210 with processor 212, memory 214, communication module 216 and analog-to-digital converter 218, monitors the terminals of the electrochromic device 104, including the anode 220, sequestration 222, sense 224 and cathode 226 terminals, for current and/or voltage in various embodiments. This information is used for both control, in the control loop, and fault detection, in the fail detect module, as shown in FIG. 1. The microcontroller 210 communicates with the AC/DC power manager 202, and these two components cooperate in managing selection 208 of AC or DC power, and battery charging 206 for a battery 228. Output of the AC/DC power manager 202 is connected to a dual rail power supply 204, which is also managed by the microcontroller 210, and provides voltage and current to the electrochromic device 104 for tinting and bleaching. In one embodiment, the relative amount of AC or DC power selected is variable under various circumstances, e.g., per window, per user, per group of windows, per group of users, and is changeable for different times, modes of operation or circumstances of operation of one or more of the smart windows 102.

A list of fault checks the smart driver may perform in some embodiments is provided below.

1. ADC Check—ADC (analog-to-digital converter) 218, which converts the analog input signals from the instrumentation circuits that measure voltages and current to digital numbers so they can be evaluated. If the ADC hardware stops running, then the data becomes stale and the control loop does not run accurately. The ADC can be monitored to make sure the ADC is always giving the software code a current stream of readings. If not, the ADC can be restarted or the system can eventually shut everything down.

2. Step Start Voltage—Before beginning to tint or bleach a panel (called running a "step"), the system can check the resting voltage of the drive and sense voltages. When a panel is disconnected from a drive and at rest, the panel voltage should be equal (or close to) the sense voltage of the panel. If not, then something is wrong with the wiring or the electronics and the system can decide not to begin the step.

3. Temperature Check—There is constant measuring of the temperature of the driver electronics. If they get too hot, there is something wrong (electronics failure or wire short) and the system stops running steps.

4. I2C Check—Some of the hardware chips on a driver board communicate to a main processor using a serial protocol called i2C, in some embodiments. If the system determines absence of communication with the other chips, then the system declares a hardware failure and stops running steps.

5. Driver Hardware Error Check—The driver hardware has an analog circuit that constantly reads the sense 224 voltage from the panel. If the sense 224 voltage goes over a prescribed limit (set in the hardware design) the hardware circuit disconnects the driver from the panel. This protects the panel from a firmware bug that might over drive the panel and is a second wall of defense for the panel. The firmware gets a signal from the hardware error circuit and logs it as a fault condition.

6. Over and Under Voltage Checks—There are four fault condition checks that run while a step is in progress. In some embodiments, the firmware control loop should keep the sense 224 voltage within the safe boundaries of the panel voltage limits. However, control loops can be tuned incorrectly (or have a bug) that lets the signal that they are trying to control overshoot the target value that the control loop is trying to reach. These voltage checks are performed independently of the control loop and provide "guard rails" that the control loop must keep the signal within or else the step will be stopped by the voltage check code. There are two positive and two negative values and both sets work the same way, but in opposite polarities. For the positive voltages, there is a "soft limit" voltage and a "hard limit" voltage. Each has a time value that is a limit of how long the control signal can be out of bounds before the fault is triggered. The idea is that the soft limit voltage is closer to the controlled target signal value, but has a longer and more generous time out value, so if the signal overshoots a little bit, but comes back within the limits quickly, a fault is not triggered. The higher ("hard") fault limit is set with a shorter time out. If the signal crosses the high limit for even a short amount of time the fault triggers and the drive is shut off. An analogy would be the lane sensing computers that are on some new cars. If the car computer sees you drifting out of your lane, it beeps to wake the driver up, but if the car drifts too far out (or for too long) it stops the car.

7. Positive and Negative Over Current Limits—While running a step, the system checks to see if the current coming in or out of the panel has exceeded a configurable limit, in which case the system declares something is wrong and stops the step.

8. Drive Voltage Output Error—The control loop in the firmware uses a hardware power amplifier circuit to output voltages on the panel wires. It knows what voltage it expects the hardware circuit to output, say 12.5 volts. The firmware constantly measures the actual output voltage. If the actual voltage does not match the commanded voltage (within a banded limit of voltage and time), then there is something wrong with the wiring or the hardware itself and the drive is shut down.

9. Sense 224 Voltage dV/dt—As a panel is driven with a positive or negative voltage, the sense voltage should follow. It does not follow instantly, but eventually should start movement in the correct direction. If it doesn't, that's a good clue that a sensing circuit has failed or the wires are not correctly connected.

10. Impedance Check—The panel tints or bleaches by applying a differential voltage to the anode and cathode wires, and electric current flows in or out of the panel. The greater the difference between the sense 224 voltage and the drive voltage, the more current flows. By comparing the difference between the panel voltage and the sense 224 voltage, then dividing by the measured current going in or out of the panel, a panel impedance can be derived (Ohms Law). The panel impedance tends to stay constant across all current ranges of a panel (if the panel is the same size). This gives a good measurement reference to compare with. (For example, one specific model of panels tends to run about at five Ohms). The system measures the impedance of the panel while running a step. If the impedance goes out of range, something is wrong and the system stops the step.

11. Minimum Current—When beginning a step, the system expects at least a little current to flow, even if the panel was completely tinted or bleached before. This is due to the battery-like nature of the panel. The system looks for this at the beginning of each step and stops the step if the system does not see any current flowing. It is a good way to tell if there is a wiring problem.

12. Sequestration Circuit Monitoring—The system could also use the wires from the sequestration 222 circuit area on the panel as another sensing point to watch. While driving the main panel, the sequestration 222 circuit voltage will also tend to follow or react to the voltage of the panel. Making sure that it follows an expected pattern or stays within bounds is a good addition for embodiments that have charge sequestration in the electrochromic device.

Benefits in performing fault detection include the following.

A failure of the wiring or electronics can make the control loop use voltage and current measurements that are incorrect and undetectable by the regular control algorithm, which assumes that everything is connected properly and all of the electronics will work as expected.

Another possible failure mode is that a software bug could be introduced into the control loop after a software upgrade, and the bug lets the control loop overdrive the electrochromic device.

Driving the electrochromic device beyond its electrical limits will often irrevocably damage it.

Software code monitors the control loop output, driver temperature, and the sense voltage and currents. Independent of the control loop, the software for fault detection compares what is actually happening vs. what is normally expected, and if anything looks unusual, (as detailed by, e.g., a list), stops the tint/bleach process in order to protect the electrochromic device.

If a fault occurs (or not), some embodiments communicate the fault status to the cloud (e.g., to a monitoring server). This will often let cloud support detect problems before the customer does.

As a further line of defense, some embodiments have a hardware circuit that looks for over voltages on the electrochromic panel sense line, and if detected, disconnects the driver from the panel. This protects the electrochromic device against bugs anywhere in the driver firmware. The driver firmware detects that the hardware fault circuit has triggered and communicates that to a cloud service as well. Having a hardware fault circuit works to protect the electrochromic device even without firmware fault detection.

For the power management, an example scenario in which a variable amount of AC and DC power is selected by the smart window control system and distributed device network is when a user selects one or two smart windows 102 of which to change tint, or the system selects some number of windows below a threshold for change of tint. The system could choose to use entirely AC power 230 to drive the power supply and produce voltage and current for changing the charge on the electrochromic device 104. But, if a much larger number of windows are selected to change tint, e.g., if there is a setting for one entire side of a building to have all the windows change tint in the morning or the evening, this might cause a voltage sag on power lines in the building. Under those circumstances, the system could choose to use a mix of some percentage of AC power 230 and some percentage of DC power, from batteries 228 in the system. In some embodiments, this could be based on active monitoring of voltages in the AC/DC power manager 202, to determine voltage sag. In another scenario, some users could have privileges for rapid change of tint of electrochromic windows, and the system could apply a predetermined maximum amount of DC power from the batteries 228 in the system, either with zero AC power or supplemented with some amount of AC power 230, to achieve this rapid change of tint. Power outage presents another set of circumstances. In one power outage mode, the terminals of the electrochromic device could be disconnected and allowed to float, with transition to this mode managed under DC power from the batteries 228 as power backup during the power fail. In another power outage mode, the electrochromic device 104 could be driven to discharge the electrochromic device 104 (i.e., bleach or clear the tint), using DC power from the batteries 228. The smart driver could manage relative usage of DC power from batteries 228 versus AC power 230 in accordance with various rules, e.g., for less power cycling of batteries 228 and longer battery life, or slower or greater rate of change of tint for the electrochromic devices 104, or thresholds for numbers of windows and amounts of tint to change, etc.

Figure 3:
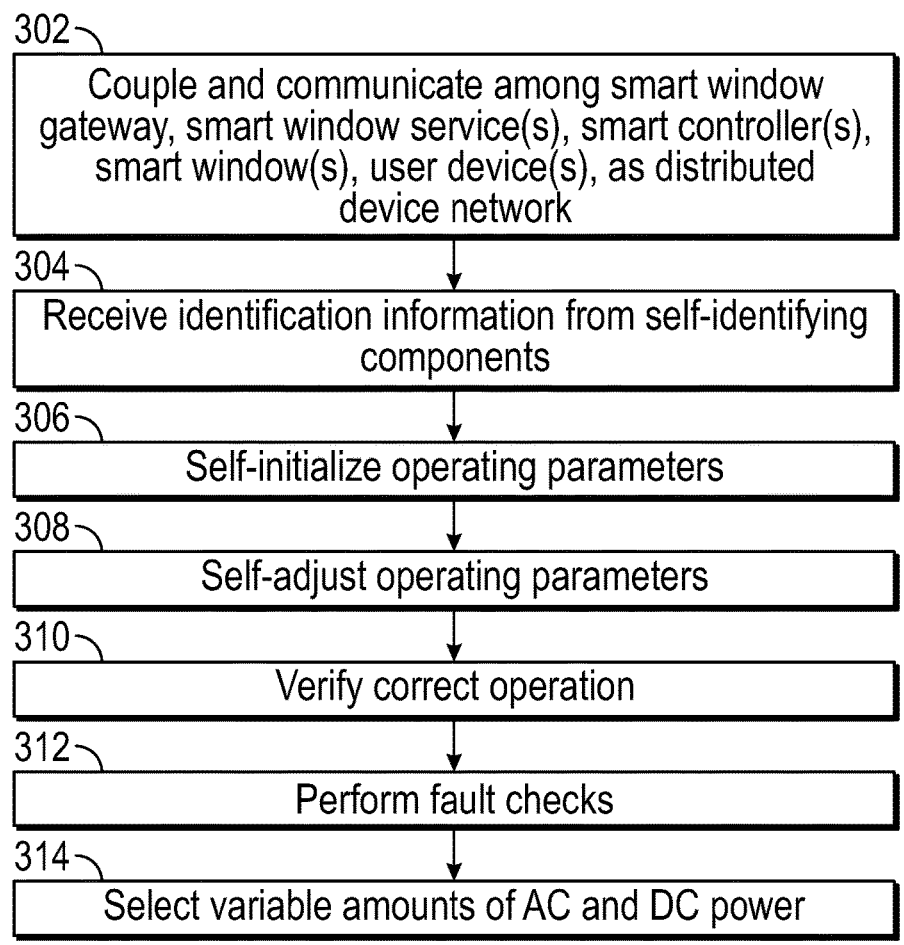
FIG. 3 is a flow diagram of a method of driving smart windows, which can be practiced by smart drivers and embodiments of the smart window system.

FIG. 3 is a flow diagram of a method of driving smart windows, which can be practiced by smart drivers and embodiments of the smart window system. The method can be practiced by various processors in components in the system. In an action 302, there is coupling and communication among a smart window gateway, smart window service(s), smart controller(s), smart window(s) and user device(s), as a distributed device network for controlling electrochromic devices in smart windows. In variations, subsets of the above, or additional devices, could form a distributed device network. In a further variation, the above could be integrated into fewer numbers of devices.

In an action 304, identification information is received from self-identifying components. For example, in one embodiment, an installer or user has a user device with a barcode reader, and scans barcodes on self-identifying components. Barcodes are sent from the user device to a component of the smart window system, where the identification information is received without need for manual user entry (e.g., typing or other form of alphanumeric entry).

In an action 306, the system self-initializes operating parameters. In one embodiment, the smart window system communicates with a smart window service through a network, and downloads parameters in accordance with the identification information received from the self-identifying components. It should be appreciated that no manual entry of parameters is needed in some embodiments.

In an action 308, the system self-adjusts (i.e., autotunes) operating parameters. No manual adjustment of parameters is needed. In an action 310, the system verifies correct operation of the various components. In an action 312, the system performs fault checks. Examples of these are described above, and further fault checks are readily devised.

In an action 314, the system selects a variable amount of AC and DC power. For example, in some versions there is both AC power and DC power, from a battery, available. The system could use primarily AC power for driving the electrochromic devices, but could use DC power for switching large numbers of electrochromic devices to avoid power sag on the AC lines in a building.

FIGS. 4A-4H illustrate an installation scenario for a smart window system installation. With reference back to FIG. 1A, a user device 101 with a barcode reader/install application guides one or more users, for example a professional installer, through an installation process to install smart windows 102, smart controller(s) 106, and/or a smart window gateway 108 at a specified location, such as a home, business or building. Some of the screens are shown in example screenshots herein, others are described, and further screens for this or other user interfaces, including graphical user interfaces (GUI) and command line interfaces (CLI), are readily devised in keeping with the teachings herein.

In one embodiment, the application 116 on the user device 101 coordinates with the install guide 138 in the smart window services 110 (see FIG. 1B), and provides information specific to a particular installation and set of smart window components while also gathering information from the installation and relaying the information back to the server 124 to store in the database 114 for ongoing monitoring 126, diagnostics 128, analytics 130 and proactive guidance 132. For example, the user could scan a barcode 112, and the application 116 directs which cable to select next and which other component to connect at the other end of the cable.

Figure 4B:
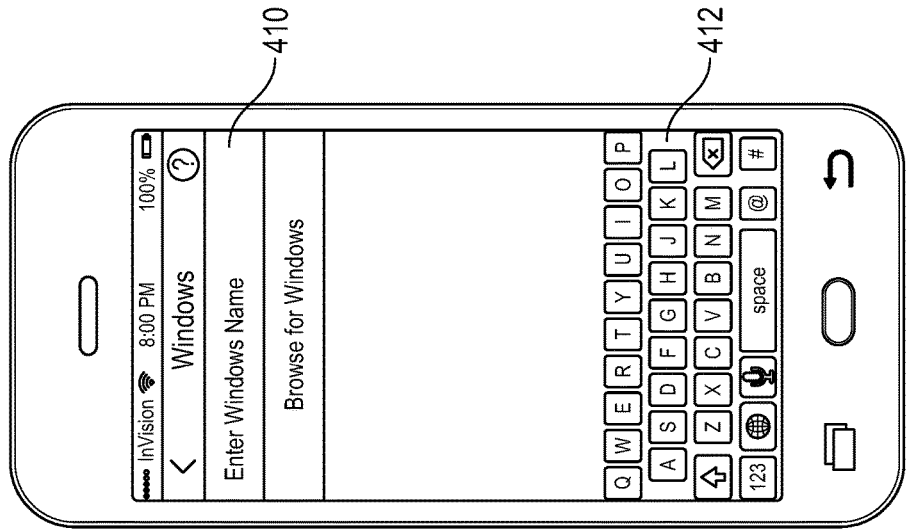
FIG. 4B is an example screenshot, showing a soft keyboard for entering a window name.
Figure 4A:
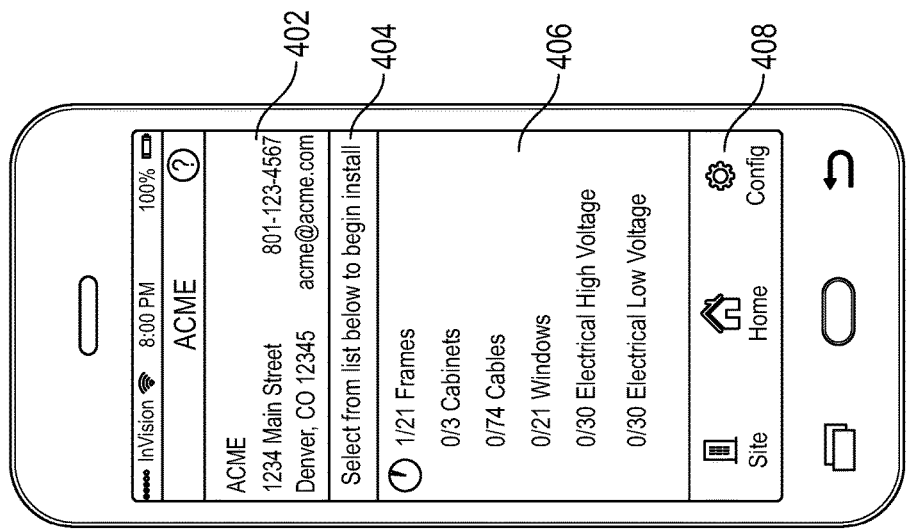
FIG. 4A is an example screenshot from a smart phone, as a user device hosting an install application for the smart window system, showing an equipment or task list for a smart window system installation.

FIG. 4A is an example screenshot from a smart phone, as a user device 101 hosting an install application for the smart window system, showing an equipment or task list 406 for a smart window system installation. Location information 402 (e.g., physical address of a building) is displayed in one field on the screen, and another field displays instruction information 404. Soft buttons 408, for example at the bottom of the screen (or could be at the top or interspersed throughout), are available for selecting to see a depiction of the site, return to a home screen, or configure aspects of the install guide or the installation itself. To proceed, the user selects (e.g., click on, tap or enter) one of the installation items on the list, such as frames, cabinets, cables, windows, electrical high-voltage or electrical low-voltage. The next screen corresponds to the selected item.

FIG. 4B is an example screenshot, showing a soft keyboard 412 for entering a window name. Instruction information 410 directs the user to browse to select a specific window, and enter a name for the window. For example, the user could enter a room name, a floor number, a coordinate from a floorplan, or other identifying information to make the specific smart window easy to locate and identify for tint adjustment or service.

Figure 4D:
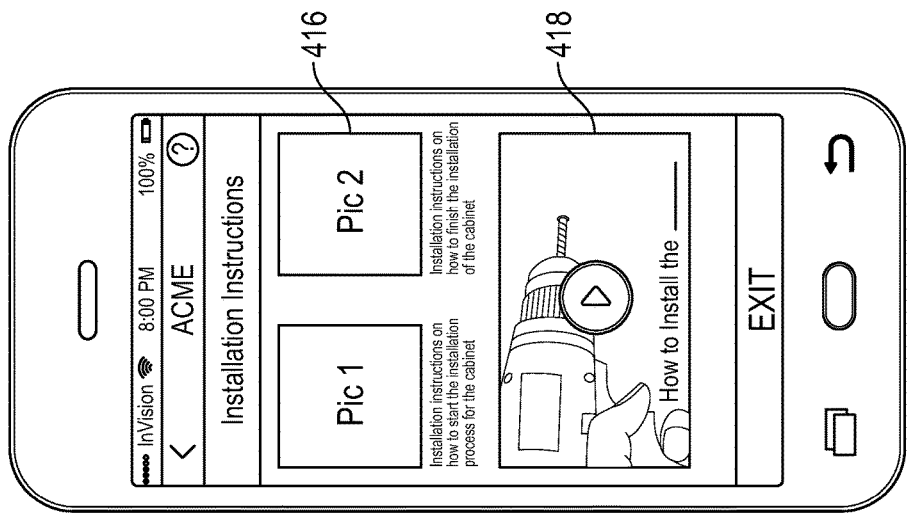
FIG. 4D is an example screenshot, showing installation instructions, including pictures, text and a video.
Figure 4C:
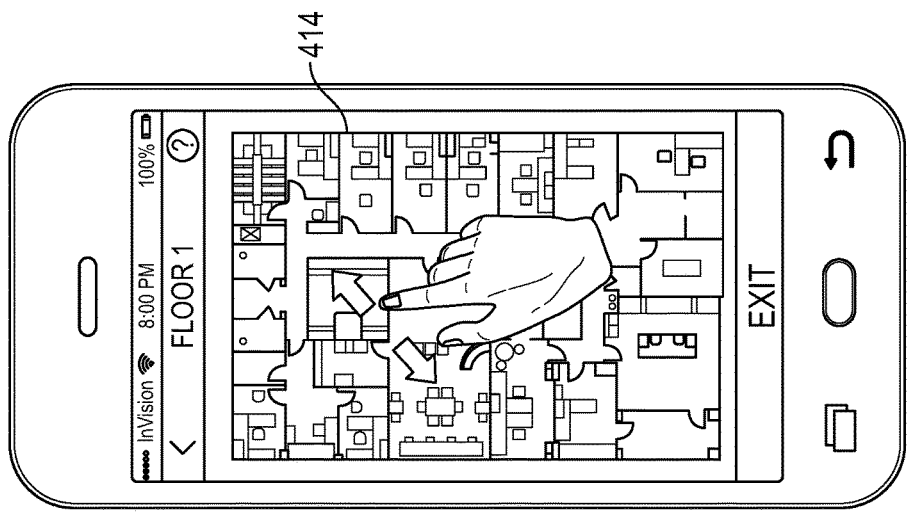
FIG. 4C is an example screenshot, showing a floorplan for where smart windows equipment is installed or to be installed.

FIG. 4C is an example screenshot, showing a floorplan 414 for where smart windows equipment is installed or to be installed. The floorplan 414 could be from architectural plans. In some embodiments this is a navigable floorplan, so that the user could enter a room and see a next view of that room and the smart windows and/or other smart window equipment of that room. In some embodiments, this is linked with installation photographs (see FIG. 4H).

FIG. 4D is an example screenshot, showing installation instructions, including pictures 416, text and a video 418. Selecting the video 418 causes the video to play. The video could be accessed via a link to the server 124 (see FIGS. 1A and 1B), or resident on the user device 101 application 116.

Figure 4E:
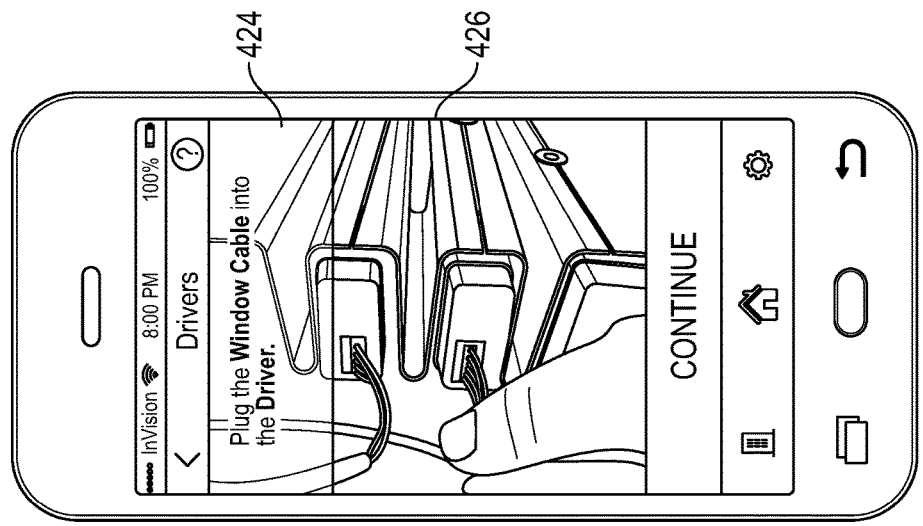
FIG. 4E is an example screenshot, showing instructions to scan a barcode of a driver and a barcode of a cable, with accompanying pictures.

FIG. 4E is an example screenshot, showing instructions to scan a barcode 112 of a driver and a barcode 112 of a cable 122 (see FIG. 1A), with accompanying pictures 420, 422. In this embodiment, a QR code (quick response code, a matrix or two-dimensional barcode) is used as the barcode 112, and a camera of a smart phone takes a picture of the barcode 112 to perform the scan. The user taps or otherwise selects the checkmark corresponding to the component that has been scanned, to complete the scanning process. Barcode information is linked or otherwise associated to the name of the component, location of the component, control of the component and monitoring of the component, in various locations in the distributed device network of the smart window system, at the installed location and/or in the smart window services 110 in various embodiments. Similar screens show instructions to scan barcodes of other components in the system.

Figure 4F:
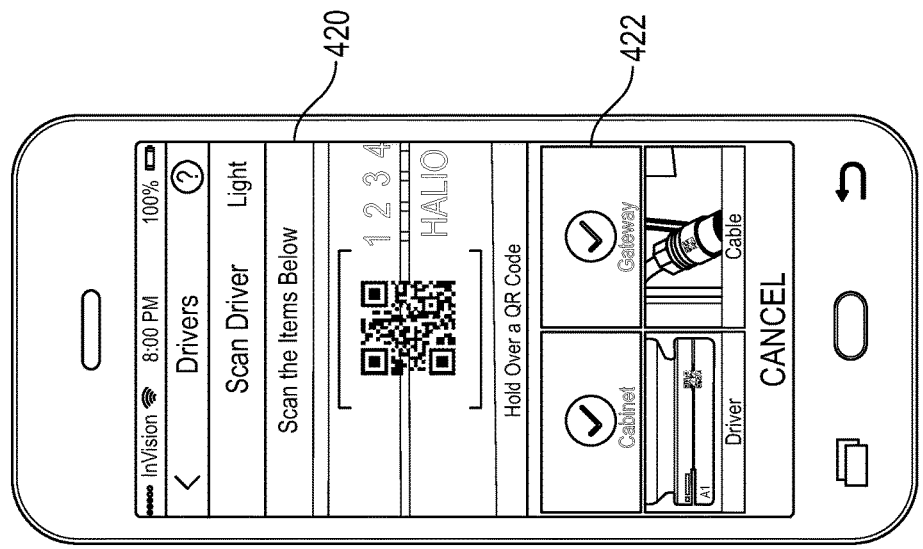
FIG. 4F is an example screenshot, showing instructions to plug a window cable into a driver, with accompanying picture.

FIG. 4F is an example screenshot, showing instructions 424 to plug a window cable into a driver, with accompanying picture 426. As with other example screens, the picture 426 could be downloaded from the server 124, for example as a match to the equipment list for specific models of components, or could be resident in the user device 101 application 116. Similar screens show instructions and accompanying pictures (or illustrations) for other aspects of installation and other components.

Figure 4H:
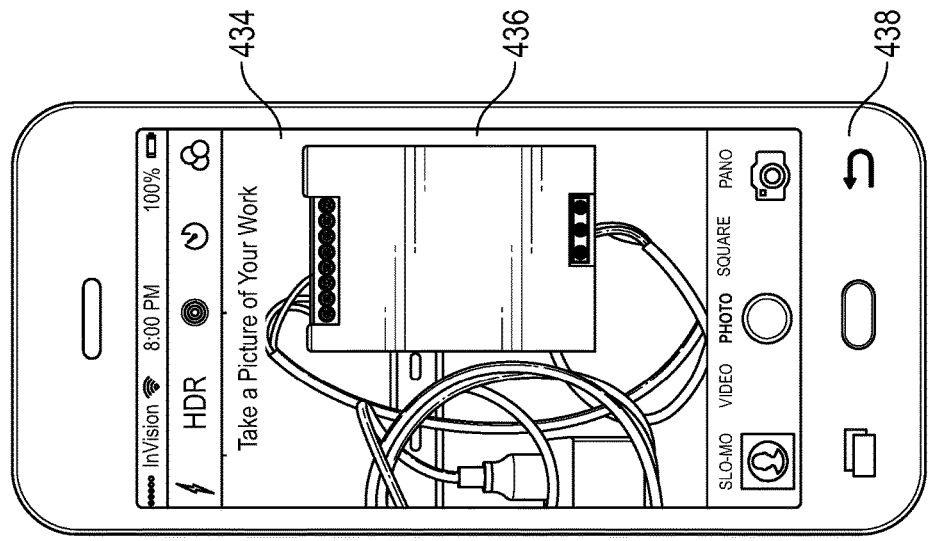
FIG. 4H is an example screenshot, showing instructions to take a picture of a completed component and wiring installation.
Figure 4G:
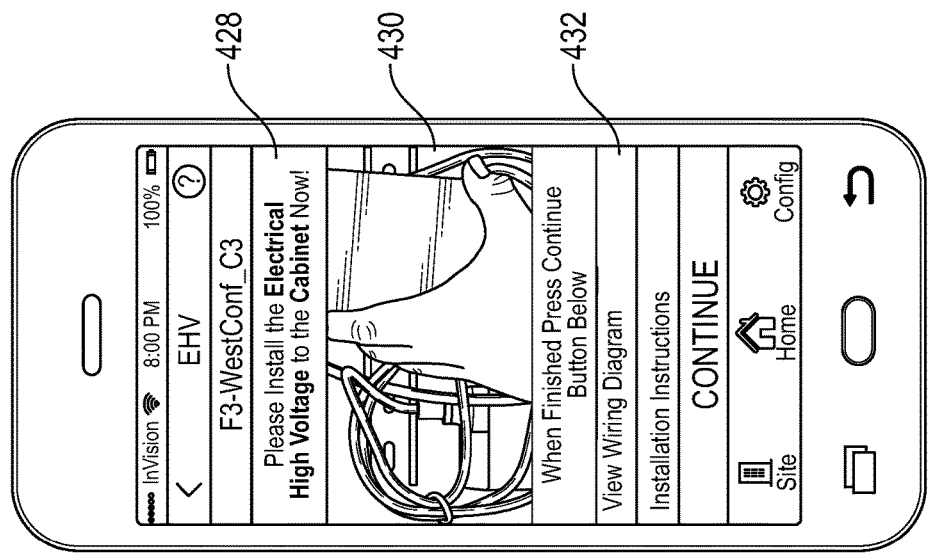
FIG. 4G is an example screenshot, showing instructions to install electrical high-voltage to a cabinet, with accompanying picture.

FIG. 4G is an example screenshot, showing instructions 428, 432 to install electrical high-voltage to a cabinet, with accompanying picture 430. Other screens show instructions to scan the barcode of the high-voltage equipment and the barcode(s) of cable(s), and are accompanied by pictures of component installation. The user can select to view a wiring diagram, see installation instructions, or continue in a sequence.

FIG. 4H is an example screenshot, showing instructions 434 to take a picture of a completed component and wiring installation. Camera controls 438 are operated by the user, and an example picture 436 shows what the completed component and wiring installation looks like. In various embodiments, the picture of the completed component and wiring insulation, for each such component installation, is uploaded to the server 124 and stored in the database 114, in association with the scanned barcodes 112, and component naming and location information.

Other screens are not shown, but readily envisioned in the context of an installation application and a user device 101). Example screens for a mobile application include a screen that directs the user to select which floor of a building is applicable for installation of a component, and indicates how many components are installed versus how many components total will be installed on that floor. A screen can instruct the user to scan a barcode on a cabinet into which high-voltage equipment is to be installed. A screen may instruct to install a driver into a cabinet, and has selections for viewing a wiring diagram or installation instructions. After wiring of the driver is complete, one screen can instruct a user to press the commissioning button on the driver, and shows a picture (or animation) of a finger pressing the button on the driver. Status information for gateways, drivers, devices, etc. is displayed on a screen, along with an activity stream. Another screen displays status (e.g., symbolized by red, yellow or green light as on a traffic signal, or alphanumeric designation, etc.) of smart windows or groups of smart windows, with floor, driver identification and window identification. An error message is displayed on one example screen, along with reasons why installation of a specific component failed, and a telephone number to call for additional help.

With reference back to FIGS. 1A-4H, a walk-through of an installation scenario is provided. The smart window system installation application on the user device 101 instructs the user as to sequences of component selection, identification, placement, and wiring. With each component installed, and each cable 122 installed, a barcode 112 is scanned, and a picture is taken. Each component can be named. After a smart window 102 is installed, the application instructs to install a driver into a specific cabinet at a specific location. The application 116 instructs to install the smart window gateway 108 into a specific cabinet at a specific location, and plug in cables 122, high-voltage, low-voltage and network connections. The application 116 and/or the install guide 138 in the smart window services 110 verifies connections are according to a customer plan 160 in the database 114, and issues status, error information and/or instructions (e.g., for manual testing using buttons and LEDs, etc.) to the user device 101 accordingly. If wiring needs to be cleaned up, the application could instruct as to rearranging cables. Information for the installation is sent to and made available in the database 114 for smart window services 110, so that automated help and human-based tech support can get technical details of the equipment and installation, including barcode information and photographs.

Remote troubleshooting, and concierge service 170 are made possible through the smart window services 110 and the database 114. For example, the user could make a movie of a component that is operating incorrectly, and send the movie and a scanned barcode 112 from the application 116 in the user device 101 to one of the smart window services 110, such as the concierge service 170 for remote troubleshooting. Monitoring 126 and diagnostics 128 should act on the scanned barcode 112, and determine whether a component corresponding to the barcode 112 has correct or faulty operating parameters or behavior over time. If a component is drawing too little or too much power, or has noisy signals or erratic signals, this could indicate a faulty component or a component that will fail soon. Proactive guidance 132 could issue recommendations for service visits or component replacement or software or hardware upgrade. Aggregated statistics across multiple installed smart window systems can be combined with installation-specific information to generate alerts or recommendations for repair or replacement of components.

Figure 5:
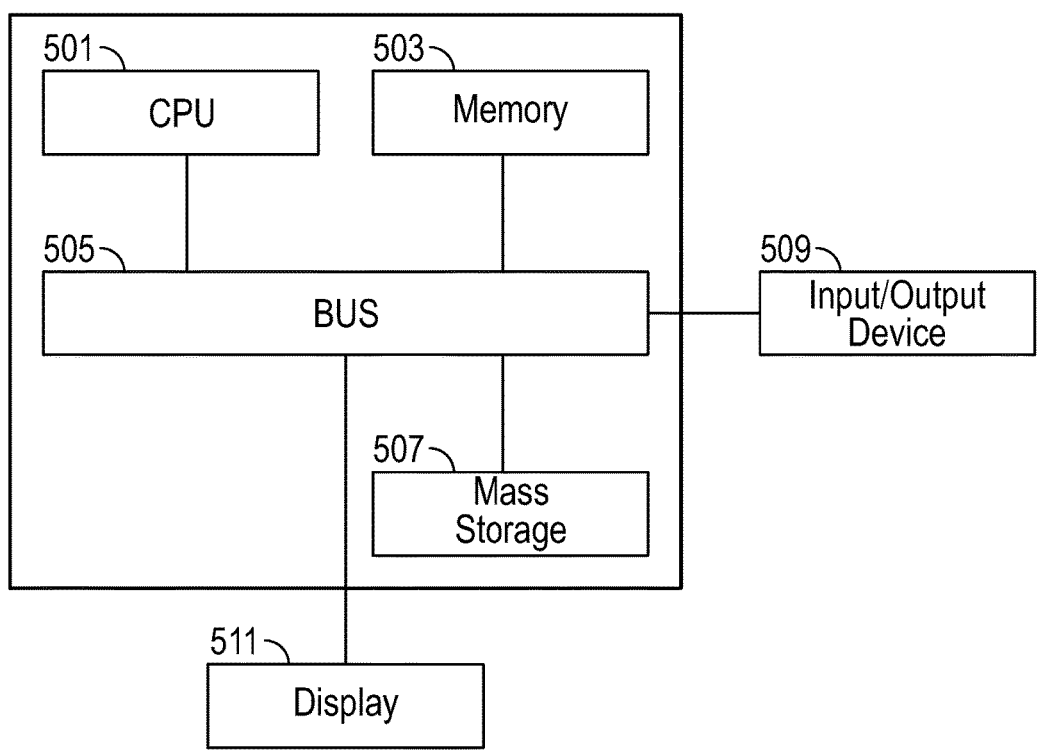
FIG. 5 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 5 is an illustration showing an exemplary computing device which may implement the embodiments described herein. The computing device of FIG. 5 may be used to perform embodiments of the functionality for the smart window driver system in accordance with some embodiments. The computing device includes a central processing unit (CPU) 501, which is coupled through a bus 505 to a memory 503, and mass storage device 507. Mass storage device 507 represents a persistent data storage device such as a floppy disc drive or a fixed disc drive, which may be local or remote in some embodiments. Memory 503 may include read only memory, random access memory, etc. Applications resident on the computing device may be stored on or accessed via a computer readable medium such as memory 503 or mass storage device 507 in some embodiments. Applications may also be in the form of modulated electronic signals modulated accessed via a network modem or other network interface of the computing device. It should be appreciated that CPU 501 may be embodied in a general-purpose processor, a special purpose processor, or a specially programmed logic device in some embodiments.

Display 511 is in communication with CPU 501, memory 503, and mass storage device 507, through bus 505. Display 511 is configured to display any visualization tools or reports associated with the system described herein. Input/output device 509 is coupled to bus 505 in order to communicate information in command selections to CPU 501. It should be appreciated that data to and from external devices may be communicated through the input/output device 509. CPU 501 can be defined to execute the functionality described herein to enable the functionality described with reference to FIGS. 1A-4H. The code embodying this functionality may be stored within memory 503 or mass storage device 507 for execution by a processor such as CPU 501 in some embodiments. The operating system on the computing device may be MS DOS™, MS-WINDOWS™, OS/2™, UNIX™, LINUX™, or other known operating systems. It should be appreciated that the embodiments described herein may also be integrated with a virtualized computing system implemented with physical computing resources.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a tangible non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A smart driver system for electrochromic devices, comprising:

at least one smart driver having one or more processors, memory and a communication module;

the at least one smart driver configurable to couple to or integrate with one or more smart windows having electrochromic devices;

the at least one smart driver configurable to input identification information from a plurality of self-identifying components of a smart window system, including the one or more smart windows, and to self-initialize or self-adjust a plurality of operating parameters for operation of the self-identifying components in accordance with the identification information; and the at least one smart driver configurable to communicate with a user device having a barcode reader application, wherein the at least one smart driver configurable to input the identification information from the plurality of self-identifying components of the smart window system comprises the at least one smart driver configurable to receive barcode information from the user device having the barcode reader application, responsive to the user device scanning barcodes on the self-identifying components of the smart window system.

2. The smart driver system of claim 1, wherein the at least one smart driver comprises:

a smart window gateway configurable to couple to a network and to one or more smart window services on the network, and configurable to couple to smart controllers;

one or more smart controllers configurable to couple to the smart window gateway and the one or more smart windows; and the smart window gateway or the one or more smart controllers configurable to couple to one or more user devices, with the smart window gateway, the one or more smart window services, the one or more smart controllers, the one or more user devices and the one or more smart windows acting as a distributed device network for controlling the electrochromic devices of the one or more smart windows.

3. The smart driver system of claim 1, further comprising:
a server, configured to receive one or more photographs of one or more of the plurality of self-identifying components as installed; and
the server further configured to store the one or more photographs in association with the identification information from the plurality of self identifying components.

4. The smart driver system of claim 1, wherein the at least one smart driver configurable to self-initialize or self-adjust the plurality of operating parameters comprises:
the at least one smart driver configurable to send data from the plurality of self-identifying components via a network to a server for diagnostics, monitoring or remote troubleshooting.

5. The smart driver system of claim 1, further comprising:
the at least one smart driver configurable to cooperate with a user device having an install application, to install, connect and verify correct operation of the self-identifying components in accordance with the self-initialized or self-adjusted plurality of operating parameters.

6. The smart driver system of claim 1, further comprising:
the at least one smart driver configurable to perform fault checks on at least two from a group consisting of:
an analog-to-digital converter configurable to couple to and monitor a smart window;
a step start voltage of the smart window;
a temperature of driver electronics;
an expected communication;
a value of a sense voltage of the smart window;
voltage limits of the smart window;
current limits of the smart window;
drive voltage to the smart window;
change in the sense voltage of the smart window;
an impedance of an electrochromic device;
an expected minimum current at a beginning of a step to the smart window; and
a sequestration circuit of the smart window.

7. A smart driver system with electrochromic devices, comprising:
a plurality of smart windows having electrochromic devices;
at least one smart driver integrated with the plurality of smart windows or configurable to couple to the plurality of smart windows;
the plurality of smart windows and the at least one smart driver having memory, one or more processors and communication capability, and being configurable to receive identification information from a plurality of self-identifying components of the smart driver system with electrochromic devices and to self-initialize or self-adjust a plurality of operating parameters for operation of the plurality of smart windows in accordance with the identification information; and
wherein the at least one smart driver is further configurable to receive barcode information from a user device scanning barcodes of the self-identifying components.

8. The smart driver system with electrochromic devices of claim 7, wherein the at least one smart driver comprises:
a smart window gateway having at least one processor and configurable to couple to a network to communicate with one or more smart window services;
one or more smart controllers each having at least one processor; and
the smart window gateway and the one or more smart controllers configurable to couple to and communicate with each other, the plurality of smart windows, one or more user devices having one or more applications, and the one or more smart window services, to act as a distributed device network for controlling the electrochromic devices.

9. The smart driver system with electrochromic devices of claim 7, wherein the at least one smart driver is configurable to cooperate with one or more smart window services in a server coupled by a network to the at least one smart driver, for monitoring or diagnostics.

10. The smart driver system with electrochromic devices of claim 7, further comprising:
the at least one smart driver configurable to cooperate with a user device having an install application, and cooperate with one or more smart window services in a server coupled by a network to the at least one smart driver, for installation and verification of operation of the self-identifying components in association with the identification information.

11. The smart driver system with electrochromic devices of claim 7, further comprising:
the at least one smart driver configurable to perform fault checks on and verify correct operation of the self-identifying components.

12. A method of driving smart windows having electrochromic devices, performed by a smart driver system, the method comprising:
receiving identification information from a plurality of self-identifying components of a smart window system, including one or more smart windows;
self-initializing a plurality of operating parameters for the plurality of self-identifying components, in accordance with the identification information, for setup of the smart window system;
self-adjusting at least one of the plurality of operating parameters, for operation of the smart window system; and
communicating with a user device having a barcode reader application, wherein the receiving the input identification information from the plurality of self-identifying components comprises receiving scanned barcodes from the user device resulting from the user device scanning barcodes of the self-identifying components.

13. The method of claim 12, further comprising:
coupling and communicating among a smart window gateway, a network, one or more smart controllers, one or more smart windows, and one or more user devices, to act as a distributed device network; and
controlling the electrochromic devices, by the distributed device network.

14. The method of claim 12, further comprising:
receiving, at a server, from a user device, one or more photographs of one or more of the plurality of self-identifying components; and
storing, in a database coupled to the server, the one or more photographs of the one or more of the plurality of self-identifying components in association with the identification information from the plurality of self-identifying components.

15. The method of claim 12, further comprising:
cooperating with one or more smart window services in a server that is coupled via a network to the smart driver system, to perform monitoring or diagnostics on the plurality of self-identifying components.

16. The method of claim 12, further comprising:
cooperating with a user device having an install application, and with one or more smart window services in a server that is coupled via a network to the smart driver system, to install, connect and verify correct operation of the self-identifying components.

17. The method of claim 12, further comprising:
performing fault checks on at least two from a group consisting of:
an analog-to-digital converter configurable to couple to and monitor a smart window;
a step start voltage of the smart window;
a temperature of driver electronics;
an expected communication;
a value of a sense voltage of the smart window;
voltage limits of the smart window;
current limits of the smart window;
drive voltage to the smart window;
change in the sense voltage of the smart window;
an impedance of an electrochromic device;
an expected minimum current at a beginning of a step to the smart window; and
a sequestration circuit of the smart window.

\* \* \* \* \*